UNITED STATES PATENT OFFICE 2,412,855

PROCESS OF SORBING IONS

Robert W. Auten, Jenkintown, and Donald S. Herr, Philadelphia, Pa., assignors to The Resinous Products & Chemical Company, Philadelphia, Pa., a corporation of Delaware No Drawing. Application November 22, 1943, Serial No. 511,352

15 Claims. (Cl. 210—24)

The present invention relates to the sorption of ions from fluids and more particularly to employment of a new kind of resinous condensation product for that purpose. It also relates to the process whereby such resinous condensation products may be prepared and to the products resulting from such process.

In accordance with this invention, resinous condensation products having ion-sorbing capacity are prepared by reacting together one or more aldehydes, a water-soluble salt of sulfurous acid, and a carbamide or an amino-azine or mixture thereof under conditions such that condensation occurs with the formation of a resinous product containing salt-forming sulfonate groups. The reaction is carried out in the presence of a solvent for the condensation product. The resulting condensate is then converted to a gel which, in turn, is heated at a temperature below its charring point until brought to an infusible state. In such state, it has cation-exchange properties and may be used to take up such cations as magnesium, zinc, tin, lead, calcium, gold, silver, and the like.

Carbamides which may be used in preparing these resinous products include urea, thiourea, cyanamide, dicyanamide, guanidine, and acyl-, alkyl-, and aralkyl-substituted ureas. While urea is the preferred carbamide, it may be replaced at least in part by other carbamides.

Amino-azines which may be employed include aminotriazines, such as melamine, melam, ammeline, thioammeline, substituted ammeline such as the methyl and ethyl derivatives, $\beta$-$\beta'$-bis-thio-ammeline diethyl ether and similar compounds as shown in United States Patent No. 2,217,667, which issued on October 15, 1940. They also include aminodiazines, such as 2,6-diamino-1,3-diazine, 5-methyl-2,6-diamino-1,3-diazine, 4-chloro-2,6-diamino-1,3-diazine, and diazine derivatives such as those shown in United States Patents Nos. 2,295,564 and 2,312,320.

Mixtures of carbamides and/or amino-azines which may be used include, for example, urea and thiourea; urea and guanidine; urea and melamine; thiourea, urea and melamine; melamine and thioammeline; urea, melamine and 2,6-diamino-1,3-diazine; melamine and 2,6-diamino-1,3-diazine; urea, thiourea and 2,6-diamino-1,3-diazine, and similar mixtures.

Aldehydes which may be employed include formaldehyde, benzaldehyde, acetaldehyde, butyraldehyde, furfuraldehyde, and mixtures of two or more aldehydes, such as formaldehyde and acetaldehyde; formaldehyde and benzaldehyde; acetaldehyde and furfuraldehyde; formaldehyde, benzaldehyde and furfuraldehyde, and the like. When mixtures of formaldehyde and other aldehydes are used, particularly interesting resins result.

In the production of certain resinous products within the scope of this invention, formaldehyde is the aldehyde of first choice. While, in such cases, it is preferred that the formaldehyde be used in solution, as in formalin, it may also be used in its polymeric forms, e. g. paraformaldehyde, or at least in part in a form, such as hexamethylene tetramine and formals, which yields formaldehyde under the conditions of the reaction. When formaldehyde is used as a reacting component, salt-forming methylene sulfonate groups are present in the resulting resin.

The salts of sulfurous acid employed in accordance herewith include bisulfites per se, sulfites which yield bisulfites under the conditions of the resin-forming reaction, and mixtures of such sulfites and bisulfites. While bisulfites form sulfonate groups in the reaction directly, sulfites of particular utility are those which yield sulfonate groups indirectly, for example by hydrolysis to the bisulfite, exemplified as follows:

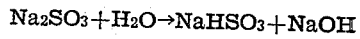

$$Na_2SO_3 + H_2O \rightarrow NaHSO_3 + NaOH$$

Since in the reaction which results in the new resins, bisulfites are immediately used up as they are added or formed, the reaction exemplified above goes to the right.

Employment of sulfurous acid salts of the alkali metals is preferred in most instances. As is well known, these metals form group IA of the periodic table which consists of lithium, sodium, potassium, rubidium, and cesium. From the standpoint of cost and availability, sodium salts, especially sodium metabisulfite of commerce, are particularly useful. An advantage of using the sulfites of the alkali metals is that the resulting resinous products are very soluble in water. In some instances, however, where solubility of the product in water is not a requisite, other salts of sulfurous acid are useful. In addition to the salts which have been mentioned above, there may be used sulfurous acid salts of amines or comparable quaternary ammonium compounds, such as trimethylamine sulfite or benzyl trimethyl ammonium bisulfite.

The use of a bisulfite per se results in a lower pH than does the use of a sulfite per se. When the condensation or polymerization reaction tends to proceed rapidly, it is desirable to employ sulfites, at least in part, in order to take advantage of their higher pH and retarding action on the rate of condensation. When the rate of condensation is slow, bisulfites per se are preferred since they impart a lower pH to the reaction mixture, thus causing condensation to progress more rapidly.

The ratio of the components in the reaction mixture may be varied widely, depending upon the type of product desired. Each reagent, as well as the amount thereof used, contributes to the final properties of the product.

For example, the ratio of aldehyde to carbamide or amino-azine is of major importance. This ratio of aldehyde may conveniently be based upon the number of reactive amino groups in the molecule of carbamide or amino-azine. For instance, urea is customarily considered to have two such groups and melamine, three. One of the hydrogen atoms of the —NH₂ group may be replaced by an alkyl group, for example, without rendering the material inoperable. A lower ratio of aldehydes is usually employed with carbamides than with amino-azines. Thus, in the case of carbamides, the preferred ratio is about 1.0 to about 1.5 mols of aldehyde per amino group. With urea, for example, the ratio of 2.0 to 3.0 mols of formaldehyde per mol of urea is preferably used. For purposes of economy, the lower ratios are desirably employed, although in some instances ratios approaching the theoretrical limit of 2.0 mols of aldehyde per amino group are useful. With amino-azines, the theoretical maximum is still two mols of aldehyde per amino group. For example, 6.0 mols of aldehyde per mol of melamine represents the theoretical maximum.

In actual practice, however, either with carbamides or amino-azines, it is preferable to use less aldehyde than the theoretical maximum in order to obtain resins which convert or "cure" more rapidly to the infusible stage. Compounds prepared with the maximum amount of aldehyde tend to split out aldehyde when heated. The absolute minimum ratio of aldehyde which is operable with either the carbamides or the amino-azines is 0.5 mol per amino group. Resins resulting from the use of this ratio are very reactive. Thus, the entire operable range is 0.5 to about 2.0 mols of aldehyde per amino group in both carbamides and amino-azines, while the preferred ratio is between about 1.0 and about 1.5 mols of aldehyde per amino group.

Of equally great importance is the proportion of the salt of sulfurous acid used in the reaction. Upon the ratio so used depends the number of sulfonate groups which are introduced into the resin molecule. Upon this number depend important properties of the resin. While it is theoretically possible to react as much as one molecule of sulfite for each molecule of aldehyde, it is preferred that a lower ratio be used. In general, the range of 0.05 to 1.0 mol of sulfite per mol of aldehyde has been found to be useful. The preferred range which has proven to be eminently satisfactory is between about 0.1 and about 0.4 mol of sulfite per mol of aldehyde.

In the preparation of the resinous products of this invention, a convenient method is to make the alkylol addition product of the aldehyde and carbamide and/or amino-azine first. When formaldehyde is used, the product is a methylol derivative. After the formation of the addition compound, it is reacted with a water-soluble salt of sulfurous acid.

In another method, the three reactants may be mixed at the outset. Alternatively, the water-soluble salt of sulfurous acid and the aldehyde may be mixed and/or reacted together prior to being combined with the carbamide and/or amino-azine.

There are apparently two reactions proceeding simultaneously, one, the condensation of the resinous product, which proceeds most rapidly at low pH values and which is manifested by an increase in viscosity, and the other, the reaction of the water-soluble salt of sulfurous acid, resulting in the addition of the sulfonate groups.

Conditions of operation will vary, depending on such factors as the amount and choice of the carbamide and/or amino-azine, the ratio and choice of aldehyde, and the type and amount of the water-soluble salt of sulfurous acid. Certain generalizations, however, may be made. Carbamide resins in general tend to condense at a slower rate than the amino-azine resins. Therefore, the carbamide condensation is preferably conducted at a lower pH and/or a higher temperature than the amino-azine condensation.

It is advisable to limit the temperature and pH of the reaction mixture so that the condensation and polymerization of the resin, which are favored by high temperature and low pH, do not proceed so fast that the reaction which produces salt-forming sulfonate groups scarcely occurs.

The range of pH maintained in the condensation of carbamides is preferably lower than that maintained in the condensation of amino-azines. The entire operable pH range over which either carbamides, amino-azines, or mixtures thereof may be used is 4 to 10. In the case of carbamides, the preferred pH range is 4 to 8; and, in the case of amino-azines, it is 7 to 10.

Usually, at a given pH, the rate of condensation may be controlled by regulating the temperature. Preferably, temperatures above 60° C. are employed, and the upper limit is ordinarily the boiling point of the reaction mixture. This boiling point depends upon the external pressure, the presence of dissolved salts, and similar factors. For the most part, it is convenient to operate at atmospheric pressure and at temperatures between 60° C. and about 105° C., the latter temperature approximating the point at which water is distilled from the reaction mixtures at normal atmospheric pressure.

To adapt them for use in ion exchange units, the resinous products are converted to the infusible form. This is preferably done by heating a solution thereof. When such solution is heated, the product further condenses or polymerizes and forms a gel. This gel is then converted to the insoluble state.

Water solutions of the resinous condensation products are particularly suited for the conversion last above referred to. However, solutions in other solvents such as alcohols, e. g. methanol, and ketones, e. g. acetone, or mixtures of such solvents and water may be used.

Heating of the solutions usually may be conducted satisfactorily at temperatures of the order of 100° C. for a period of a few hours, as, for example, in a temperature-controlled oven. Such heating is conducted for a period of time sufficient to convert the gel to an insoluble resinous mass. The time and temperature required to effect the conversion extend within relatively wide limits, depending upon the particular condensate being converted. Temperatures between about 85° C. and 135° C. or even higher may be used for converting the condensates. In any event, the time and/or temperature should be adjusted so that an insoluble resinous mass is formed without substantial decomposition thereof. Decomposition may be indicated by evolution of some of the aldehyde and/or charring of the product.

The insoluble resinous mass which results from conversion of the gel is porous and sponge-like. Such mass may be comminuted or crushed and screened to appropriate sizes for particular uses to which it is to be applied. Since the area of the exposed surface plays an important role in ion exchange phenomena, the importance of the physical form of the resin is evident. Particles between 0.25 mm. and 0.5 mm. in diameter have been found to be generally satisfactory for use in columns.

While other methods of conversion may be employed, the method above described has been found to be particularly satisfactory. Such other methods are exemplified as follows: The condensate, while still in the original reaction mixture, may be spray-dried to a powder, and the thus-powdered material may be converted to the infusible form.

The incompletely converted resinous products may be supported on materials such as cloth, paper, asbestos, clay, etc., and converted thereon to the infusible form. This procedure gives very unusual effects and makes it possible, for example, to treat fabric with resin, convert the resin, and thereafter exchange the metal attached to the salt-forming sulfonate group. Thus, sodium may be exchanged for a heavy metal.

While all of the resins prepared by the various methods indicated above from carbamides and/or amino-azines have ion exchange or ion-adsorbing capacity, as a general rule the products made with amino-azines are preferred because they are more satisfactory in ion-adsorbing units over a long period of time.

The following examples will serve to illustrate specific embodiments within the scope of this invention.

*Example 1*

Two hundred ninety-one and eight-tenths grams of 37% aqueous formaldehyde solution, which is equivalent to 3.6 mols of formaldehyde, was placed in a three-necked flask equipped with a stirring device, a thermometer, and a reflux condenser. The pH of the aqueous formaldehyde was adjusted to 5.8–6.2 with 10% aqueous $Na_2CO_3$. Stirring was begun and continued throughout the condensation reaction. One hundred and nine-tenths grams (0.8 mol) of melamine was added. The pH was determined by means of a Beckman pH meter equipped with a glass electrode and was adjusted to 7.0 to 7.5. The mixture was heated to 80° C. and held at 80°–85° C. for ten minutes to form methylol melamine. At this point 50.4 grams (0.4 mol) of sodium sulfite was added. The pH was found to be above 9. The mixture was maintained for one hour at 80°–85° C. The pH was then brought to a value of 8.0 to 8.5 by the careful addition of 50% aqueous formic acid. The reaction was continued at 80°–85° C. until a viscosity of ten poises for a 55% solution of the resin was obtained. The contents of the flask were poured into a shallow pan, which was then placed in an oven at 105° C. for a period of five hours. During this time, the solution became more viscous and ultimately formed a gel. At the end of the heating period, the resin was found to be converted to the infusible stage and had a porous, sponge-like structure. The resin was comminuted and screened to yield particles having an average particle size of 0.3 to 0.4 mm. in diameter.

This resin was tested for cation-adsorbing capacity by filling a cylindrical column therewith and passing solutions containing cations therethrough. Not only did the resin take up cations such as magnesium, zinc, calcium, iron, manganese, lead, etc., but it also took up more per unit volume or unit weight of resin than did commercial products, green-sands and carbonaceous zeolites, which are marketed for this purpose. In quantitative comparative tests, the green-sands were found to have a capacity equivalent to 2600–2800 grains of $CaCO_3$ per cubic foot, while commercial carbonaceous zeolites had a capacity equivalent to 6400 to 7500 grains per cubic foot. The resin prepared as above described had an average capacity equivalent to 9500 grains of $CaCO_3$ per cubic foot. Furthermore, the resin did not impart color to the fluids, even when left in contact therewith for an extended period of time.

*Example 2*

A mixture of 150 grams of urea (2.5 mols) and 445.5 grams of 37% aqueous formaldehyde (5.5 mols) was simultaneously agitated and heated at 80° C. under reflux in a suitable container equipped with stirrer, thermometer, and reflux condenser. The aqueous formaldehyde had previously been brought to a pH of 7–8 by the addition of a 10% aqueous solution of sodium carbonate. The rate of heating was so regulated that the exothermic reaction resulting in the formation of dimethylolurea did not carry the temperature above 80° C. A total of 47.5 grams of anhydrous sodium metabisulfite, $Na_2S_2O_5$, (0.25 mol) and 4.5 grams (0.25 mol) of water were added and heating was continued. The pH was adjusted to 5.4–6.0, as measured by a Beckman pH meter equipped with a glass electrode, by the cautious addition of a 50% aqueous solution of formic acid. Agitation was continued throughout the reaction, and the pH was carefully controlled while the mixture was heated at refluxing temperature until a viscosity of about 1.4 poises (25° C.) was reached. After a short period of refluxing, the reaction mixture became dilutable in all proportions with water at room temperature. Water solubility remained even after a protracted period of refluxing. When the reaction reached the point where the viscosity of the mixture was 4 poises at 50% solids, it was discontinued. The pH was finally adjusted to 7–8 with a 10% aqueous solution of sodium carbonate.

The rate of viscosity increase may be accelerated by distilling off water. While the reaction may be arrested at any stage by cooling the mixture, it has been found that stoppage at a viscosity within the range of from about 1 to about 10 poises for a 50% solution is very satisfactory in the preparation of resin in accordance herewith.

After the reaction mixture reached the viscosity of four poises, it was transferred to a shallow pan, which was placed in an oven at 110° C. for a period of ten hours. During this time, the solution became more viscous and ultimately formed a gel. At the end of the heating period, the resin was converted to the infusible stage and had a sponge-like structure.

After the resin was comminuted and screened to 20–30 mesh, it was packed in a cylindrical column and was tested for ion-adsorbing properties. It was found to have high ion exchange capacity.

Example 3

One hundred seven and three-tenths grams of chilled redistilled acetaldehyde (at about 10° C.) was added to 100.8 grams of chilled distilled water (at about 10° C.). The pH of the solution was adjusted to 7.2–8.0 with a 10% aqueous sodium carbonate solution. Sixty-six grams of urea was then added.

The above solution was transferred to an autoclave and was heated for one hour under pressure at 75°–82° C. A precipitate formed which was separated by filtration and washed with water. The resulting product, an alkylol derivative of urea, was insoluble in water at concentrations as low as ½% at temperatures as high as 100° C.

To 140 grams of distilled water were added 6.4 grams of sodium metabisulfite and 50 grams of the alkylol urea derivative formed above. The pH was adjusted to 4.2–5.0. The mixture was agitated in a flask provided with a reflux condenser through which brine was circulated at −5° to 0° C. The reaction mixture was heated on an oil bath to gentle reflux. The alkylol urea derivative dissolved readily upon reaction with the metabisulfite. The agitation and refluxing were continued until a one-volume sample showed no precipitation upon dilution with twenty volumes or more of water. Approximately ten minutes' refluxing was required. During this period, the pH rose to the range of 6.0–7.0, which served as further evidence of the reaction of the metabisulfite and the alkylol urea derivative. Finally, the pH was adjusted to 7.0–8.0 with 10% aqueous sodium carbonate solution.

The mixture was then transferred to a shallow pan, which was placed in an oven at 110° C. for a period of ten hours. During this time, the solution became more viscous and ultimately formed a gel. At the end of the heating period, the resin was converted to the infusible stage and had a sponge-like structure.

This resin also had a high capacity for adsorbing cations.

Example 4

The pH of 254 grams of 37% aqueous formaldehyde solution was adjusted to 5.8–6.2 with 10% aqueous sodium carbonate. Sixty-three grams of melamine and thirty grams of urea were added to the formaldehyde solution, and the mixture was agitated and warmed to 80° C. under reflux. As soon as all solid material had dissolved, the pH was adjusted to 7.0–7.5 (glass electrode). The reaction mixture was held at 80°–85° C. for ten minutes, during which time the methylol derivatives were formed. Forty-four and one-tenth grams of sodium sulfite was then added. The formaldehyde-sulfite interaction raised the pH to approximately 9.

The reaction mixture was held at 80°–85° C. and was agitated for one hour, after which the pH was lowered to 7.8–8.2 (glass electrode) by careful addition of a 50% aqueous formic acid solution. The reaction was continued at 80°–85° C. until the viscosity increased to 0.5 poise (25° C.), and no precipitation occurred when one volume of the reaction product was diluted with twenty volumes of water.

The product was transferred to a shallow pan and was thereafter heat-treated as in Example 3. This resin exhibited high ion-adsorbing capacity when tested in the above-described manner.

Any of the resins prepared as indicated, in their infusible form and preferably after being comminuted and screened to a uniform granular state, may be used for the exchange of one cation for another. While the exchange may be effected by passing a fluid containing cations through a bed of the ion-exchanging material in a salt form, the exchange may also be effected by other means of contact, such as by stirring a batch of the resinous material in a liquid containing cations to be exchanged. The exchange process may be intermittent, semi-continuous, or continuous.

Revivification or regeneration of the exchange material, when it has become spent, may be accomplished by treatment of the spent material with a liquid containing these cations desired for exchange purposes. For example, aqueous solutions of sodium chloride or potassium chloride may be passed through a bed of material which has become spent by exchange of sodium or potassium ions for calcium and/or magnesium ions, with the result that the calcium and/or magnesium ions in the resin are replaced with sodium or potassium. The regenerated resin is then washed free of the spent regenerant solution, for example, with softened water or desalted or deionized water, whereupon it is ready for reuse.

The products of this invention have distinct advantages over other cation-adsorbing materials, such as green-sands or carbonaceous zeolites. They have considerably greater ion exchange capacity. This is of the utmost importance since a greater quantity of cation can be adsorbed before the resins become "exhausted" and require regeneration. The resins do not "throw color." By "color throwing" is meant the imparting of color to the liquids by the ion-adsorbing materials used in the treatment thereof. The products of this invention have unusually good alkali- and acid-resistance and, therefore, may be used for the treatment of fluids in a wide range of pH both above and below pH 7. In this respect, they are superior to previously known cation-adsorbers. They have very satisfactory density and may be backwashed without difficulty. In still another respect, they have a substantial advantage over other materials used as ion exchangers in that these resins do not excessively swell on being wet.

Finally, since these resins are entirely non-silicious, they do not contaminate with silica fluids treated therewith, in contrast to green-sands and carbonaceous zeolites which may do so. It is particularly undesirable to impart silica to water to be used as boiler-feed water, because silica forms a scale on the boilers. Contamination with silica has been so great during the use of some green-sands and carbonaceous zeolites that it has been necessary to feed sodium hydroxide into the water in order to prevent the deposition of scale, a procedure which is unnecessary with the cation-exchangers of this invention.

The resins of this invention when in their salt form are highly useful for exchange of cations and have a high capacity for such cations as calcium, barium, magnesium, and iron, for instance. They may be regenerated with the conventional brines and, in general, thus brought back to high capacity for cation exchange. During repeated use and regeneration, it is advisable from time to time to use a brine which has a high pH attained, for example, by adjustment with an alkaline material. Such treatment apparently overcomes tendency of the resins to form in part inner salts between acid sulfonate groups and nitrogenous groups.

We claim:

1. A process for preparing infusible, water-insoluble, cation-sorbing resins of high capacity containing salt-forming sulfonate groups which comprises reacting at a pH of 4 to 10 by condensing together as the essential reactants (a) an aldehyde from the group consisting of formaldehyde, acetaldehyde, butyraldehyde, furfuraldehyde, and benzaldehyde, (b) a water-soluble salt of sulfurous acid and a metal of group IA of the periodic table, and (c) a member of the group of melamine, melam, ammeline, thioammeline, methyl ammeline, ethyl ammeline, $\beta,\beta'$-bis-thioammeline diethyl ether, 2,6-diamino-1,3-diazine, 5-methyl-2,6-diamino-1,3-diazine, and 4-chloro-2,6-diamino-1,3-diazine, at a temperature at which these components form a condensate containing salt-forming sulfonate groups, the reaction being effected in the presence of a solvent for the condensate, the aldehyde being present in an amount between about 0.5 and 2 mols per reactive amino group in said member of the above class and said salt being present in an amount between about 0.05 and 1 mol per mol of aldehyde, heating the condensate dissolved in the solvent until a gel is formed, heating the gel at a temperature and for a time sufficient to form an infusible, resinous, porous mass, and comminuting said mass.

2. A process for preparing infusible, water-insoluble, cation-sorbing resins of high capacity containing salt-forming sulfonate groups which comprises reacting at a pH of 4 to 10 by condensing together as the essential reactants (a) an aldehyde from the group consisting of formaldehyde, acetaldehyde, butyraldehyde, furfuraldehyde, and benzaldehyde, (b) a water-soluble salt of sulfurous acid and a metal of group IA of the periodic table, and (c) a member of the group consisting of melamine, melam, ammeline, thioammeline, methyl ammeline, ethyl ammeline, $\beta,\beta'$-bis-thioammeline diethyl ether, 2,6-diamino-1,3-diazine, 5-methyl-2,6-diamino-1,3-diazine, and 4-chloro-2,6-diamino-1,3-diazine, at a temperature at which these components form a condensate containing salt-forming sulfonate groups, the reaction being effected in the presence of a solvent for the condensate, the aldehyde being present in an amount between about 1 and 1.5 mols per reactive amino group in said member of the above class and said salt being present in an amount between about 0.1 and 0.4 mol per mol of aldehyde, heating the condensate dissolved in the solvent until a gel is formed, heating the gel at a temperature and for a time sufficient to form an infusible, resinous, porous mass, and comminuting said mass.

3. A process for preparing infusible, water-insoluble, cation-sorbing resins of high capacity containing salt-forming sulfonate groups which comprises reacting at a pH of 4 to 10 by condensing together as the essential reactants (a) formaldehyde, (b) a water-soluble salt of sulfurous acid and a metal of group IA of the periodic table, and (c) a member of the group consisting of melamine, melam, ammeline, thioammeline, methyl ammeline, ethyl ammeline, $\beta,\beta'$-bis-thioammeline diethyl ether, 2,6-diamino-1,3-diazine, 5-methyl-2,6-diamino-1,3-diazine, and 4-chloro-2,6-diamino-1,3-diazine, at a temperature at which these components form a condensate containing salt-forming sulfonate groups, the reaction being effected in the presence of a solvent for the condensate, the formaldehyde being present in an amount between about 1 and 1.5 mols per reactive amino group in said member of the above class and said salt being present in an amount between about 0.1 and 0.4 mol per mol of formaldehyde, heating the condensate dissolved in the solvent until a gel is formed, heating the gel at a temperature and for a time sufficient to form an infusible, resinous, porous mass, and comminuting said mass.

4. A process for preparing infusible cation-sorbing resins of high capacity containing salt-forming sulfonate groups which comprises reacting at a pH of 4 to 10 by condensing together as the essential reactants (a) formaldehye, (b) a water-soluble salt of sulfurous acid and a metal of group IA of the periodic table, and (c) melamine at a temperature at which these components form a condensate containing salt-forming sulfonate groups, the reaction being effected in the presence of a solvent for the condensate, the formaldehyde being present in an amount between 3 and 4.5 mols per mol of melamine and said salt being present in an amount between 0.1 and 0.4 mol per mol of formaldehyde, heating the condensate dissolved in the solvent until a gel is formed, and heating the gel at a temperature within the range of from about 80° C. to about 135° C. until an infusible resinous mass forms.

5. The product resulting from the process of claim 1.

6. The product resulting from the process of claim 2.

7. The product resulting from the process of claim 3.

8. The product resulting from the process of claim 4.

9. The process of removing cations from fluids containing same which comprises bringing the cation-containing fluid into contact with an infusible cation-sorbing resin and thereafter separating said resin and said fluid, the resin being a product prepared by reacting at a pH of 4 to 10 by condensing together as the essential reactants (a) an aldehyde from the group consisting of formaldehyde, acetaldehyde, butyraldehyde, furfuraldehyde, and benzaldehyde, (b) a water-soluble salt of sulfurous acid and a metal of group IA of the periodic table, and (c) a member of the group consisting of melamine, melam, ammeline, thioammeline, methyl ammeline, ethyl ammeline, $\beta,\beta'$-bis-thioammeline diethyl ether, 2,6-diamino-1,3-diazine, 5-methyl-2,6-diamino-1,3-diazine, and 4-chloro-2,6-diamino-1,3-diazine, at a temperature at which these components form a condensate containing salt-forming sulfonate groups, the reaction being effected in the presence of a solvent for the condensate, the aldehyde being present in an amount between about 0.5 and 2 mols per reactive amino group in said member of the above class and said salt being present in an amount between about 0.05 and 1 mol per mol of aldehyde, heating the condensate dissolved in the solvent until a gel is formed, heating the gel at a temperature and for a time sufficient to form an infusible, resinous, porous mass, and comminuting said mass.

10. The process of removing cations from fluids containing same which comprises bringing the cation-containing fluid into contact with an infusible cation-sorbing resin and thereafter separating said resin and said fluid, the resin being a product prepared by reacting at a pH of 4 to 10 by condensing together as the essential reactants (a) an aldehyde from the group consisting of formaldehyde, acetaldehyde, butyraldehyde, furfuraldehyde, and benzaldehyde, (b) a water-soluble salt of sulfurous acid and a metal of group IA of the periodic table, and (c) a member of the group consisting of melamine, melam, ammeline, thioammeline, methyl ammeline, ethyl ammeline, $\beta,\beta'$-bis-thioammeline diethyl ether, 2,6-diamino-1,3-diazine, 5-methyl-2,6-diamino-1,3-diazine, and 4-chloro-2,6-diamino-1,3-diazine, at a temperature at which these components form a condensate containing salt-forming sulfonate groups, the reaction being effected in the presence of a solvent for the condensate, the aldehyde being present in an amount between about 1 and 1.5 mols per reactive amino group in said member of the above class and said salt being present in an amount between about 0.1 and 0.4 mol per mol of aldehyde, heating the condensate dissolved in the solvent until a gel is formed, heating the gel at a temperature and for a time sufficient to form an infusible, resinous, porous mass, and comminuting said mass.

11. The process of removing cations from fluids containing same which comprises bringing the cation-containing fluid into contact with an infusible cation-sorbing resin and thereafter separating said resin and said fluid, the resin being a product prepared by reacting at a pH of 4 to 10 by condensing together as the essential reactants (a) formaldehyde, (b) a water-soluble salt of sulfurous acid and a metal of group IA of the periodic table, and (c) a member of the group consisting of melamine, melam, ammeline, thioammeline, methyl ammeline, ethyl ammeline, $\beta,\beta'$-bis-thioammeline diethyl ether, 2,6-diamino-1,3-diazine, 5-methyl-2,6-diamino-1,3-diazine, and 4-chloro-2,6-diamino-1,3-diazine, at a temperature at which these components form a condensate containing salt-forming sulfonate groups, the reaction being effected in the presence of a solvent for the condensate, the formaldehyde being present in an amount between about 1 and 1.5 mols per reactive amino group in said member of the above class and said salt being present in an amount between about 0.1 and 0.4 mol per mol of formaldehyde, heating the condensate dissolved in the solvent until a gel is formed, heating the gel at a temperature and for a time sufficient to form an infusible, resinous, porous mass, and comminuting said mass.

12. The process of removing cations from fluids containing same which comprises bringing the cation-containing fluid into contact with an infusible cation-sorbing resin and thereafter separating said resin and said fluid, the resin being a product prepared by reacting at a pH of 4 to 10 by condensing together as the essential reactants (a) formaldehyde, (b) a water-soluble salt of sulfurous acid and a metal of group IA of the periodic table, and (c) melamine, at a temperature at which these components form a condensate containing salt-forming sulfonate groups, the reaction being effected in the presence of a solvent for the condensate, the formaldehyde being present in an amount between 3 and 4.5 mols per mol of melamine and said sale being present in an amount between 0.1 and 0.4 mol per mol of formaldehyde, heating the condensate dissolved in the solvent until a gel is formed, heating the gel at a temperature within the range of from about 80° C. to about 135° C. until an infusible, resinous, porous mass forms, and comminuting said mass.

13. A process for preparing infusible cation-sorbing resins of high capacity containing salt-forming sulfonate groups which comprises reacting at a pH of 4 to 10 by condensing together as the essential reactants (a) formaldehyde, (b) a sodium salt of sulfurous acid, and (c) melamine, at a temperature at which these components form a condensate containing salt-forming sulfonate groups, the reaction being effected in the presence of a solvent for the condensate, the formaldehyde being present in an amount between 3 and 4.5 mols per mol of melamine and said salt being present in an amount between 0.1 and 0.4 mol per mol of formaldehyde, heating the condensate dissolved in the solvent until a gel is formed, and heating the gel at a temperature within the range of from about 80° C. to about 135° C. until an infusible resinous mass forms.

14. The product resulting from the process of claim 13.

15. The process of removing cations from fluids containing same which comprises bringing the cation-containing fluid into contact with an infusible cation-sorbing resin and thereafter separating said resin and said fluid, the resin being a product prepared by reacting at a pH of 4 to 10 by condensing together as the essential reactants (a) formaldeyhle, (b) a sodium salt of sulfurous acid, and (c) melamine, at a temperature at which these components form a condensate containing salt-forming sulfonate groups, the reaction being effected in the presence of a solvent for the condensate, the formaldehyde being present in an amount between 3 and 4.5 mols per mol of melamine and said salt being present in an amount between 0.1 and 0.4 mol per mol of formaldehyde, heating the condensate dissolved in the solvent until a gel is formed, heating the gel at a temperature within the range of from about 80° C. to about 135° C. until an infusible, resinous, porous mass forms, and comminuting said mass.

ROBERT W. AUTEN.
DONALD S. HERR.